(12) United States Patent
Cassell et al.

(10) Patent No.: US 9,291,363 B1
(45) Date of Patent: Mar. 22, 2016

(54) PORTABLE HEATER TRAY

(71) Applicant: Procom Heating, Inc., Brea, CA (US)

(72) Inventors: Shannon G. Cassell, Easley, SC (US); Joseph B. Lee, Jr., Bowling Green, KY (US)

(73) Assignee: PROCOM HEATING, INC., Brea, CA (US)

( * ) Notice: Subject to any disclaimer, the term of this patent is extended or adjusted under 35 U.S.C. 154(b) by 554 days.

(21) Appl. No.: 13/750,577

(22) Filed: Jan. 25, 2013

(51) Int. Cl.
*F23C 3/00* (2006.01)
*F24H 3/04* (2006.01)
*F23D 14/36* (2006.01)

(52) U.S. Cl.
CPC .............. *F24H 3/0488* (2013.01); *F23D 14/36* (2013.01)

(58) Field of Classification Search
USPC ........... 431/158; 126/110 B, 110 R; 219/411; 310/89
See application file for complete search history.

(56) References Cited

U.S. PATENT DOCUMENTS

| | | | |
|---|---|---|---|
| 1,376,852 A | 5/1921 | Andresen | |
| 2,097,729 A | 11/1937 | Mall | |
| D135,833 S | 5/1943 | Holthouse | |
| 3,522,888 A | 8/1970 | Grams et al. | |
| 4,313,417 A * | 2/1982 | Briggs et al. | 126/110 B |
| 4,424,795 A | 1/1984 | Plessner | |
| 5,111,127 A | 5/1992 | Johnson | |
| 5,308,156 A | 5/1994 | Gutierrez | |
| 5,799,958 A | 9/1998 | Bishop | |
| 6,398,235 B1 | 6/2002 | Cary | |
| 7,168,714 B2 | 1/2007 | Gibbs | |
| D559,962 S | 1/2008 | Dean et al. | |
| D567,345 S | 4/2008 | Dean et al. | |
| 7,374,018 B1 | 5/2008 | Thrun | |
| 7,417,437 B1 | 8/2008 | Torres | |
| 7,500,681 B2 | 3/2009 | Steadman | |
| 8,146,583 B1 * | 4/2012 | Lee, Jr. | 126/110 B |
| 8,485,175 B1 * | 7/2013 | Hayes et al. | 126/110 B |
| 8,816,254 B2 * | 8/2014 | Zoucha | 219/411 |
| 2006/0104836 A1 | 5/2006 | Phillips | |
| 2006/0137937 A1 | 6/2006 | Pratt | |
| 2008/0181589 A1 | 7/2008 | Dean et al. | |
| 2011/0056898 A1 | 3/2011 | Foley | |

* cited by examiner

*Primary Examiner* — Avinash Savani
(74) *Attorney, Agent, or Firm* — Middleton Reutlinger (57) ABSTRACT

A portable heating unit is provided with an elongated housing and a tray. The tray may be positioned above the housing. The tray may be secured to a handle of the portable unit along with the housing of the portable heating unit. The tray may also include sloping surfaces of the tray bottom wall and dividers separating compartments of the tray. The tray may also narrow in the direction of airflow from the inlet end to the outlet end of the housing.

19 Claims, 9 Drawing Sheets

PORTABLE HEATER TRAY

TECHNICAL FIELD

The present invention relates to portable heating units in particular to a portable heating unit with a tray.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

The portable forced air heating unit 10 depicted in the Figures provides for a tray 20 that includes one or more surfaces for, but not limited to, equipment or materials needed in a convenient proximity to the user while in a variety of heater environments.

Kerosene forced air heaters conventionally include a housing, a burner head assembly mounted within the housing, and an air blower system within the housing behind the burner head assembly. Fuel (kerosene, fuel oil, or diesel fuel, etc.) is conveyed to the burner head assembly and combustion chamber. The blower supplies combustion air to the burner head assembly and forces hot combustion gases from the burner head assembly while cooling the exterior of the burner head assembly and combustion chamber. Although a kerosene forced air heater is shown in detail it is understood that the embodiments of the invention may be used in any type of portable forced air heater such as, but not limited to, a gas or multi-fuel forced air heater.

As shown in FIGS. 1-9, there is one embodiment of a portable forced air heating unit 10 within which a tray 20 is utilized. Unit 10 includes a fuel tank assembly 70, an elongated housing 50 superposed upon the fuel tank assembly 70, and a controls compartment 60 disposed between so as to join the housing 50 to fuel tank assembly 70. Housing 50 includes a combustion chamber assembly 40, described herein, within which a mixture of fuel and air is burned, and the fuel tank assembly 70 contains a reservoir or tank 74 of fuel for burning within the combustion chamber. Routed through controls compartment 60 between fuel tank assembly 70 and housing 50 is a fuel line 81 and air line 82 and appropriate controls whose structure and function are well-known in the art are associated with the housing 50 and fuel tank assembly 70 for controlling the heater operation. It should also be understood that the controls compartment 60 may be located or mounted in any number of positions and be a variety of dimensions, shapes, quantities, and construction.

Figure 1:
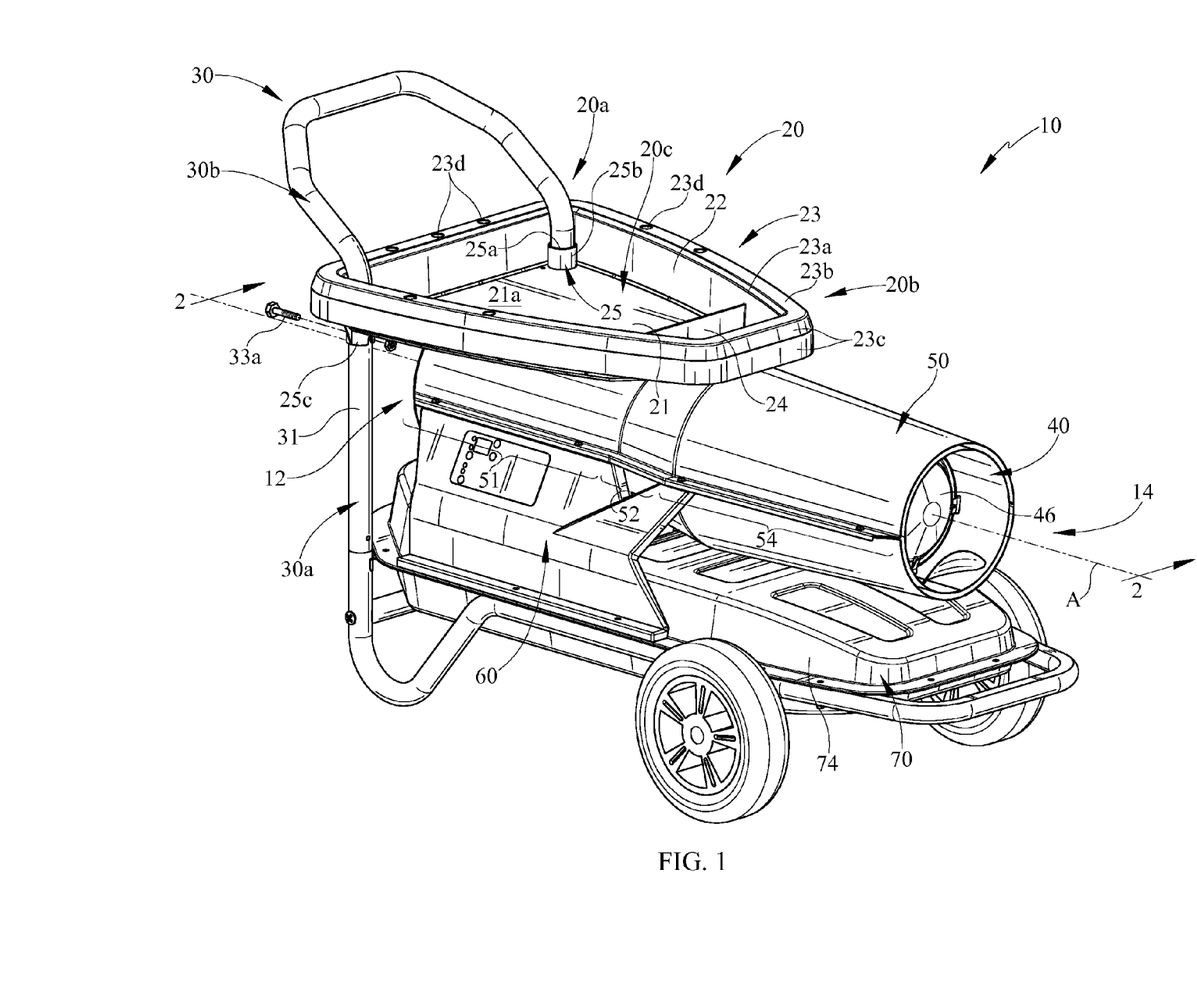
FIG. 1 is a front perspective view of a portable forced air heating unit according to one embodiment.
Figure 2:
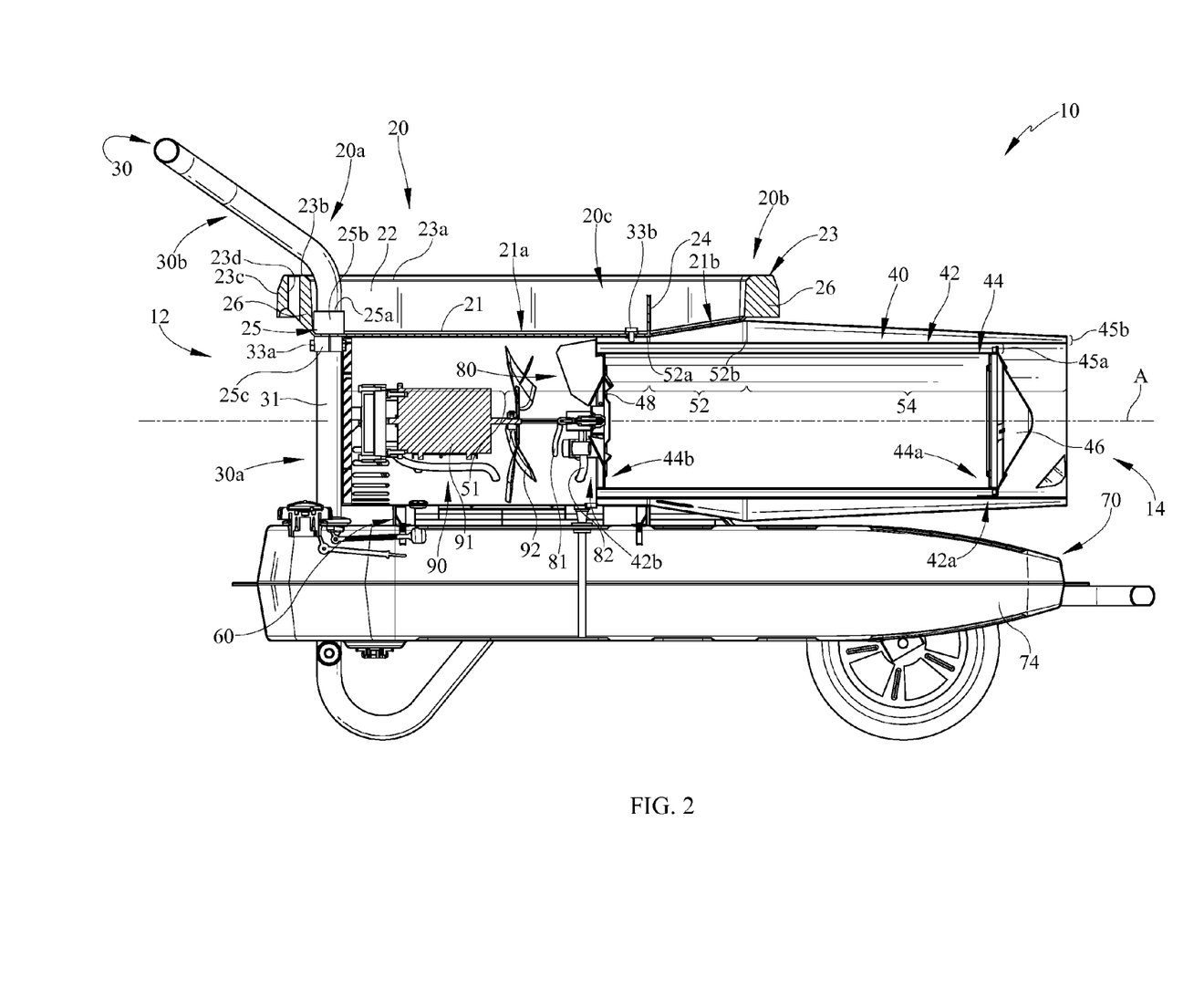
FIG. 2 is sectional view of the heating unit of FIG. 1 taken along line 2-2.
Figure 3:
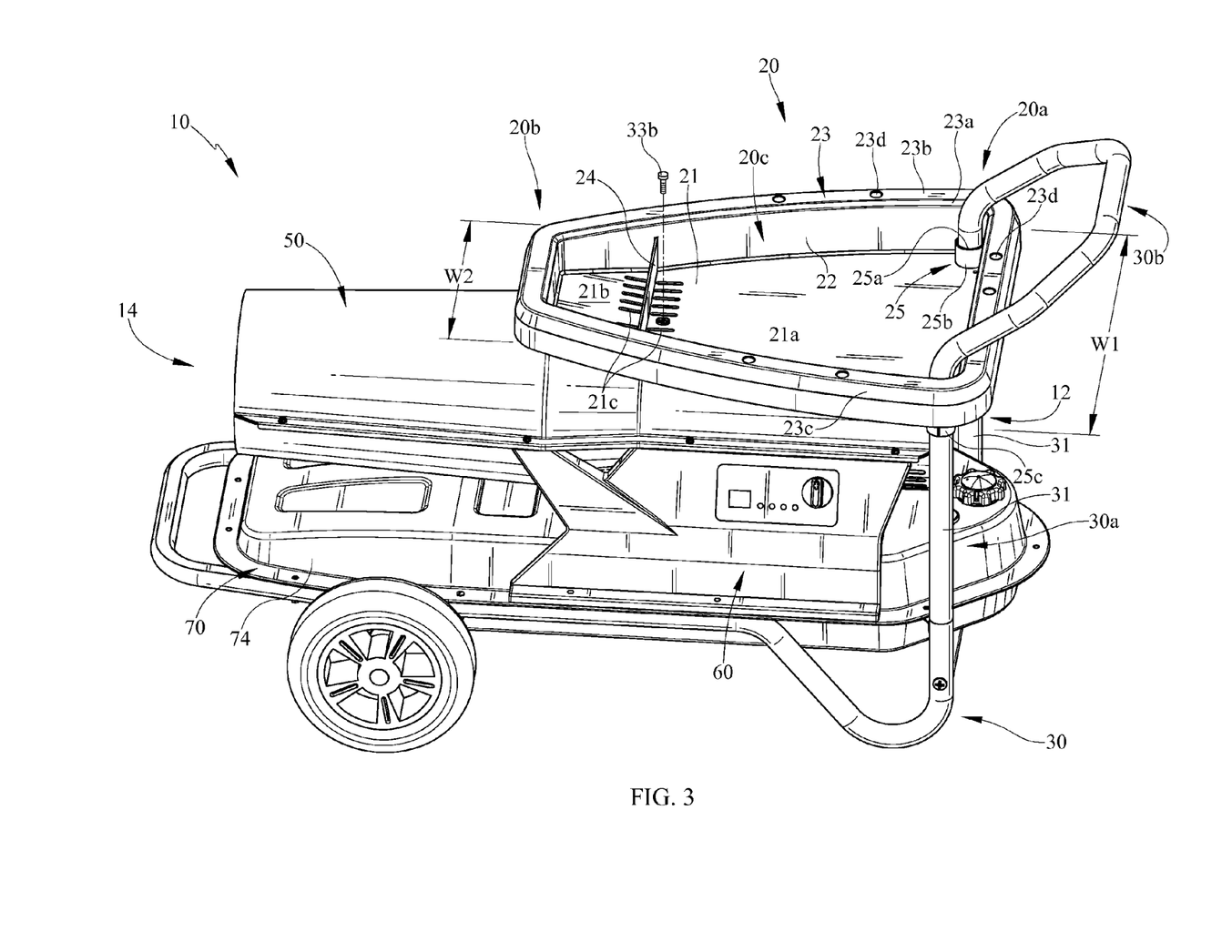
FIG. 3 is a top, rear perspective view of a heating unit of FIG. 1.
Figure 4:
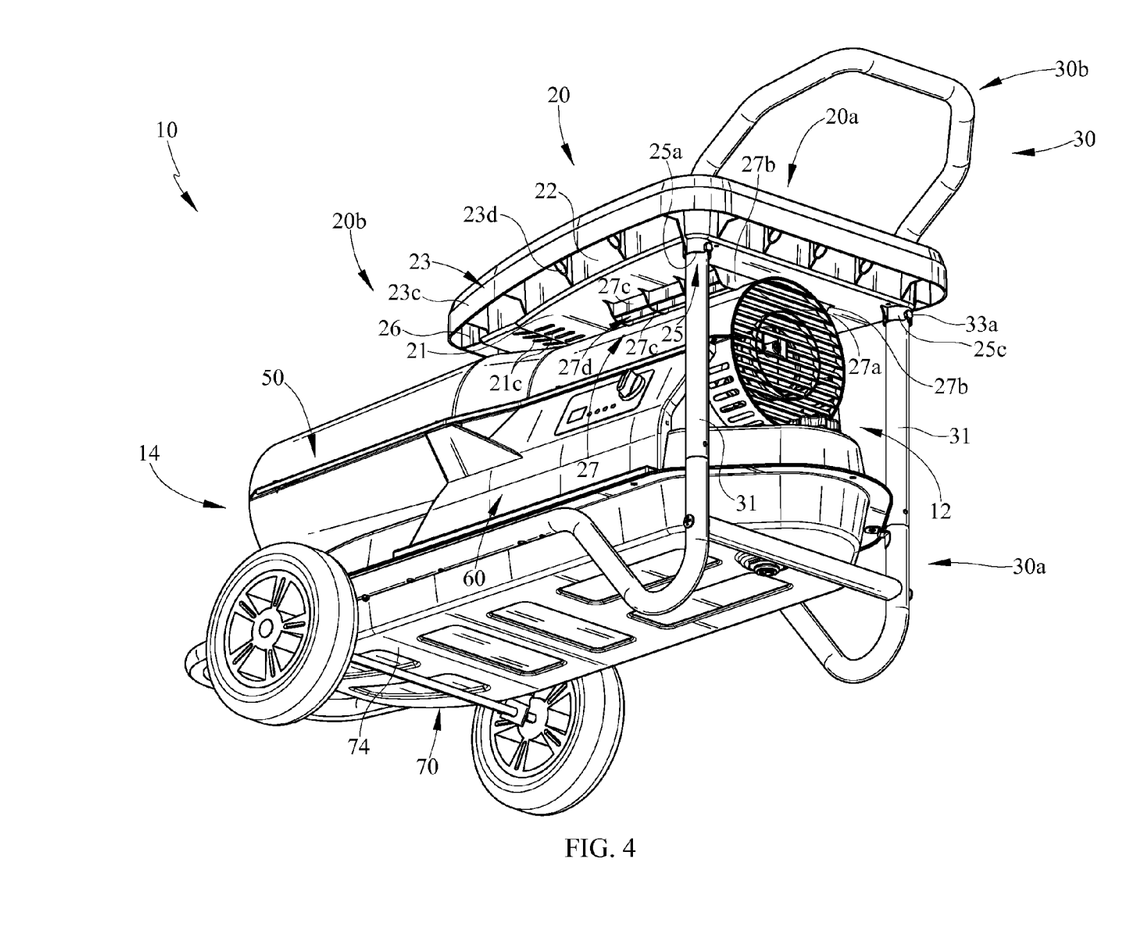
FIG. 4 is a bottom, rear perspective view of the heating unit of FIG. 1.
Figure 5:
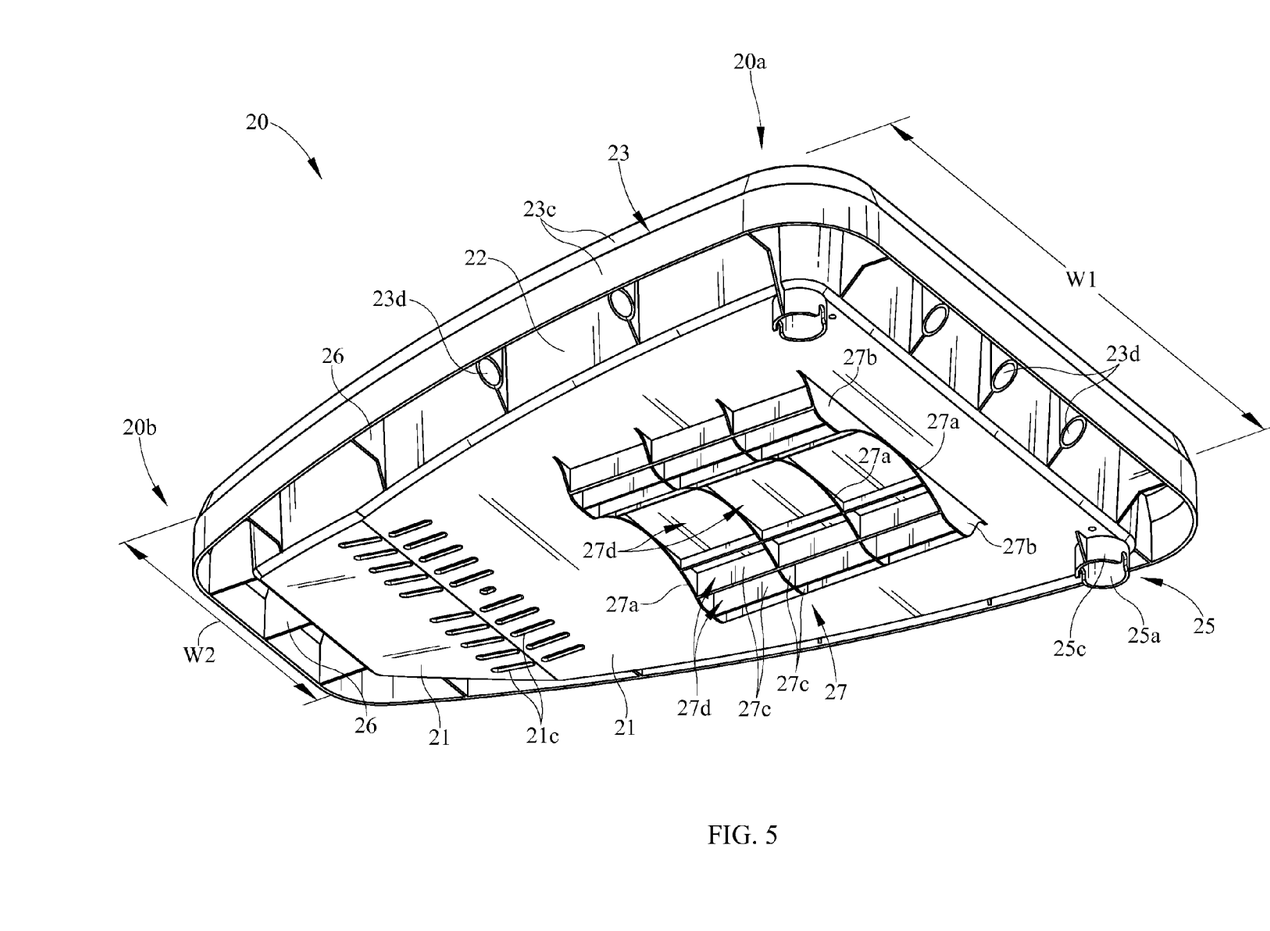
FIG. 5 is a bottom, rear perspective view of the tray of FIG. 1.
Figure 6:
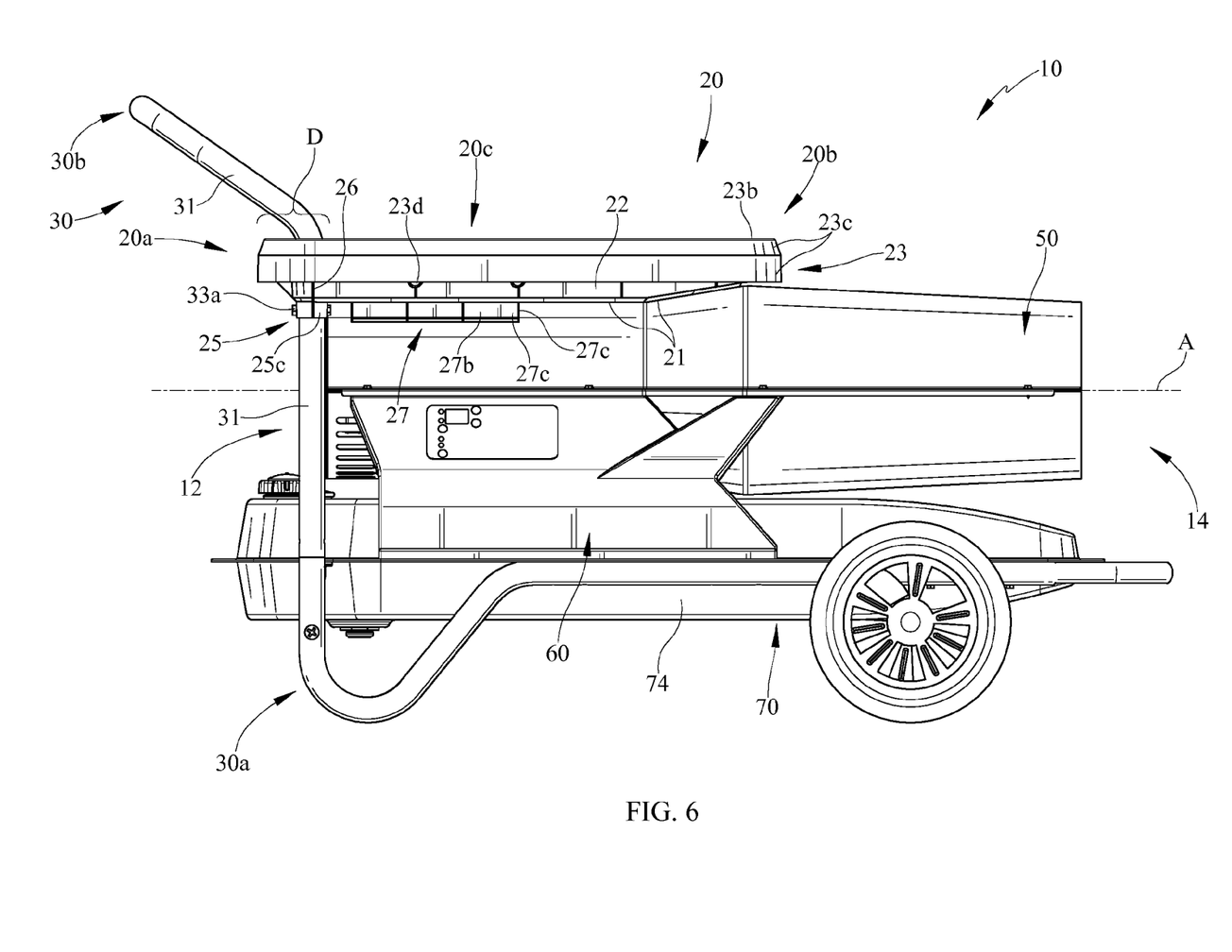
FIG. 6 is a side view of the heating unit of FIG. 1.

Elongated housing 50 is generally cylindrical and may support a combustion chamber assembly 40, best shown in FIGS. 1 and 2. Housing 50 and/or combustion chamber assembly 40 may be a variety of different shapes, sizes, configurations, constructions, and still be within the scope of the embodiments. Combustion chamber assembly 40 may include a cylindrical outer shell or heat shield 42 and/or a cylindrical inner shell or combustion chamber 44 therewithin. Combustion chamber 44 is arranged substantially centrally of heat shield 42 so that a radial or annular spacing 45a exists between combustion chamber 44 and heat shield 42 and/or housing 50. Heat shield 42 has two opposing ends 42a and 42b, and combustion chamber 44 has two opposing ends 44a and 44b corresponding with heat shield ends 42a, 42b, respectively. One end or inlet end 44b of the combustion chamber 44 is covered by a burner head assembly 80, and the opposing end or outlet end 44a of combustion chamber 44 is covered by the afterburner 46. Combustion chamber assembly 40 is supported within housing 50 by, for example, brackets joined between housing 50 and heat shield 42 so that a radial or annular spacing 45b exists between the housing and the heat shield. It is understood that the airflow cooling channel, spacing, or gaps to allow airflow between the housing and heat shield, combustion chamber, or combustion chamber assembly may be a variety of sizes, shapes, dimensions radially or longitudinally, orientations, and constructions and still be within the scope of the embodiments.

During operation of heating unit 10, air is drawn from the surrounding environment through inlet end 12 of housing 50, heated, and then forced out of outlet end 14 to heat the surrounding environment. Burner head assembly 80 includes an air line 82 in fluid communication with the motor and pump assembly 90. Motor 91 drives a fan 92 to draw air from the back of the unit or inlet end 12 in order to circulate or push air into and around a combustion chamber assembly. When pushed air circulates around the combustion chamber assembly through the annular spacing 45a, 45b the housing wall 50 is cooled. Air may be circulated through a rear plate 48 when entering combustion chamber assembly 40. A mixture of fuel and air is routed into the combustion chamber 44 through burner head assembly 80 where it is burned in a combustion process. The fuel may be delivered to the combustion chamber 44 through fuel line 82 in the form of oil droplets formed by an atomizing process. Regardless of the atomizing process, however, incomplete combustion may occur within the combustion chamber 44 due to non-uniformity in size of the fuel droplets or an uneven mixing of the fuel droplets with air. Combustion chamber outlet end 44a provides the discharge end for combustion chamber 44, and the afterburner 46 is positioned adjacent the outlet end 44a of the chamber 44 for burning fuel particles which are not burned within the combustion chamber 44 to reduce the likelihood that unburned fuel particles will be discharged from heater 10 and enter the surrounding environment. The air is heated and provides a stream of clean, hot air out of the exit or outlet end 14 of unit 10. Air circulated between the combustion chamber assembly 40 and housing 50 cools the burner head assembly 80, combustion chamber assembly 40, and housing 50.

As shown in FIGS. 1-4 and 6-9, tray 20 is positioned above the cylindrical housing 50 of the unit 10. Tray 20 includes a bottom wall 21 adjacent the housing 50 and the sidewall 22 projecting away from the bottom wall 21 or stated alternatively outwardly away from the housing 50. The sidewall 22 surrounds and defines the outer periphery of the tray opening 20c. Although it should be understood that the bottom wall could be a continuous curve and define a tray opening. A rim 23 may outwardly extend from the sidewall 22. The rim 23 may include the inner wall 23a, top wall 23b, and outside wall 23c. The rim top wall 23b may include one or more openings 23d therethrough for, but not limited to, attaching tools or other objects or heat dissipation from below the tray 20. The rim 23 may also be interconnected to the sidewall 22 and/or bottom wall 21 by one or more ribs 26 spaced about the periphery of the rim 23 and/or sidewall 22. These ribs 26 may also include the openings 23d therethough as described above. Ribs 26 may stabilize the tray 20 and its outer periphery, more specifically the rim 23 relative to the sidewall 22 and/or bottom wall 21. Further, the bottom wall 21 may include one or more sloping surfaces in the interior and/or exterior of the tray 20. For example in the tray interior, a rear bottom wall surface 21a extends substantially parallel to the longitudinal axis A or housing 50. A front bottom wall surface 21b, opposing the rear bottom wall surface 21a, extends from a higher end at a higher elevation at the front portion 20b of the tray 20 to a lower elevation towards the inlet end 12 of the housing 50 and merges with the rear bottom wall surface 21a. The tray opening 20c may include one or more dividers 24 therein to create one or more compartments within the tray opening 20c. For example, one divider 24 is positioned between the rear bottom wall surface 21a and the front bottom wall surface 21b or perpendicular to the longitudinal axis A of the housing 50. Tray 20 may also include one or more openings 21c through the bottom wall 21 for, but not limited to, venting or dissipating heat upwardly therethrough or for draining water or other fluids accumulated within the tray opening 20c. For example, one or more apertures 21c may be located through the front and rear bottom wall surfaces 21b, 21a on opposing sides of the divider 24. The position of the apertures 21c relative to the housing 50 may also assist in diverting water or fluids away from the housing 50.

As illustrated in FIGS. 1-9, heating unit 10 includes one or more handles or handle carrier 30 for transporting the heating unit 10 between desired heating environments by a user. Although shown as a wheel barrel carrier with corresponding wheels, the handle carrier 30 may be of a variety of constructions, shapes, sizes, and quantities. As shown, the handle carrier 30 includes a rearward handle section disposed outwardly from the inlet end 12 of the housing 50. The handle carrier 30 may extend through the tray 20, with a lower handle portion 30a positioned below the tray 20 connected to an upper handle portion 30b positioned above the tray 20. Or stated alternatively, a pair of parallel handle members 31 extends vertically and laterally offset from the housing longitudinal axis A. The handle members 31 inwardly merge or close together above the tray 20 and/or housing 50. Separable handle members 31 allow for releasably securing the tray 20 to the handle members 31 and housing 50.

As is shown in Figures, tray 20 is secured to the housing 50 and the handle carrier 30. Although it is understood that the tray 20 may be affixed or releasably attached to the heating unit 10 in a variety of positions or constructions. The embodiment shown illustrates a first attachment to the handle carrier 30 and a second attachment to the housing 50 of the heating unit 10. The first attachment may include the rear portion 20a of the tray 20 adjacent the housing inlet end 12 secured or fixed to the handle carrier 30. More specifically, one or more members 31 of the handle carrier 30 are received by one or more tray collars 25. The collar 25 defines an opening 25a through the bottom wall 21 receiving a handle member 31 therein. The collar 25 may include an upper collar 25b extending above the bottom wall 21 and within the periphery of the sidewall 22 and a lower collar 25c extending below the bottom wall 21. The lower collar 25c may be secured or affixed at the handle member 31 by a first fastener 33a. The second attachment may include the front portion 20b of the tray 20 secured or fixed to the housing 50. As shown the bottom wall 21 is secured or affixed by a second fastener 33b to the housing 50 at the uppermost extent of the cylindrical housing 50. This three point attachment thus includes the first attachment to the handle carrier 30 at two lateral positions spaced from the longitudinal axis A of the housing 50 and the second attachment to the housing 50 along the longitudinal axis A creating a secured and supported tray.

Although the attachments of the tray 20 relative to the heating unit 10 is shown in detail in the drawings, it merely represents one embodiment, and it is to be understood that the attachments may be of a variety of positions relative to the housing or unit, quantities, shapes, and constructions which may be used and still be within the scope of these embodiments.

Figure 7:
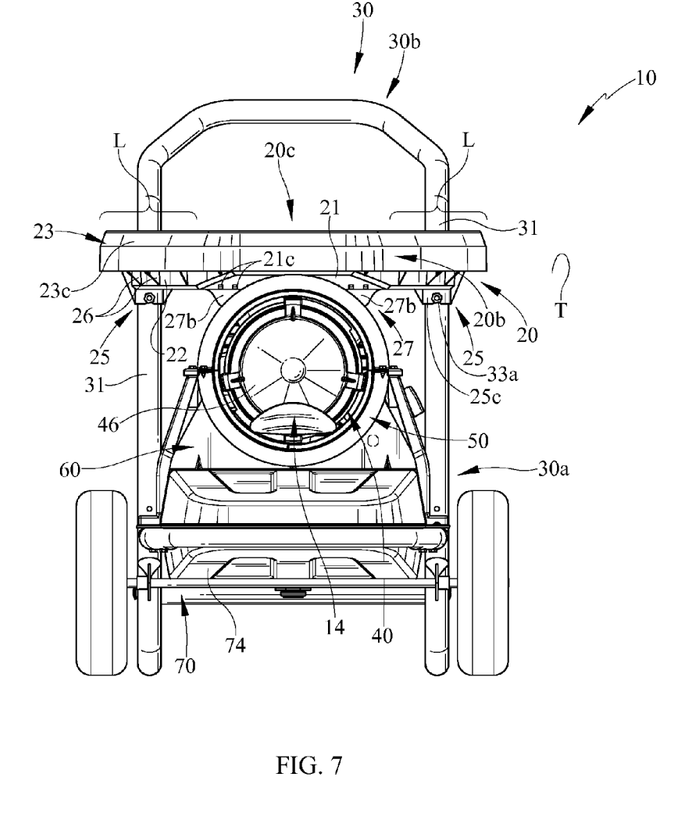
FIG. 7 is a front view of the heating unit of FIG. 1.
Figure 8:
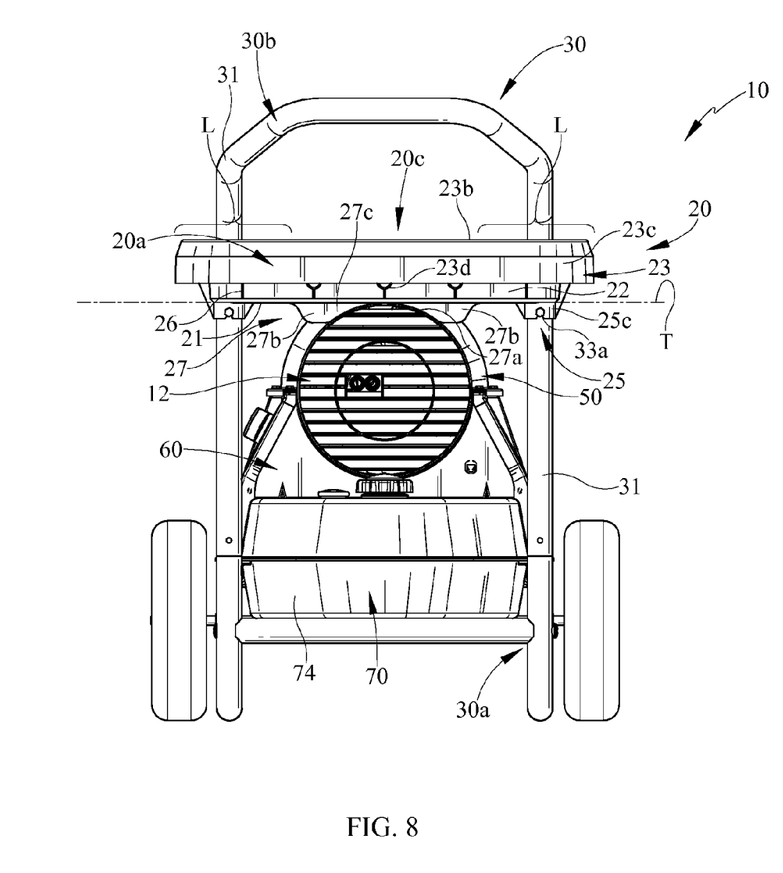
FIG. 8 is a rear view of the heating unit of FIG. 1.
Figure 9:
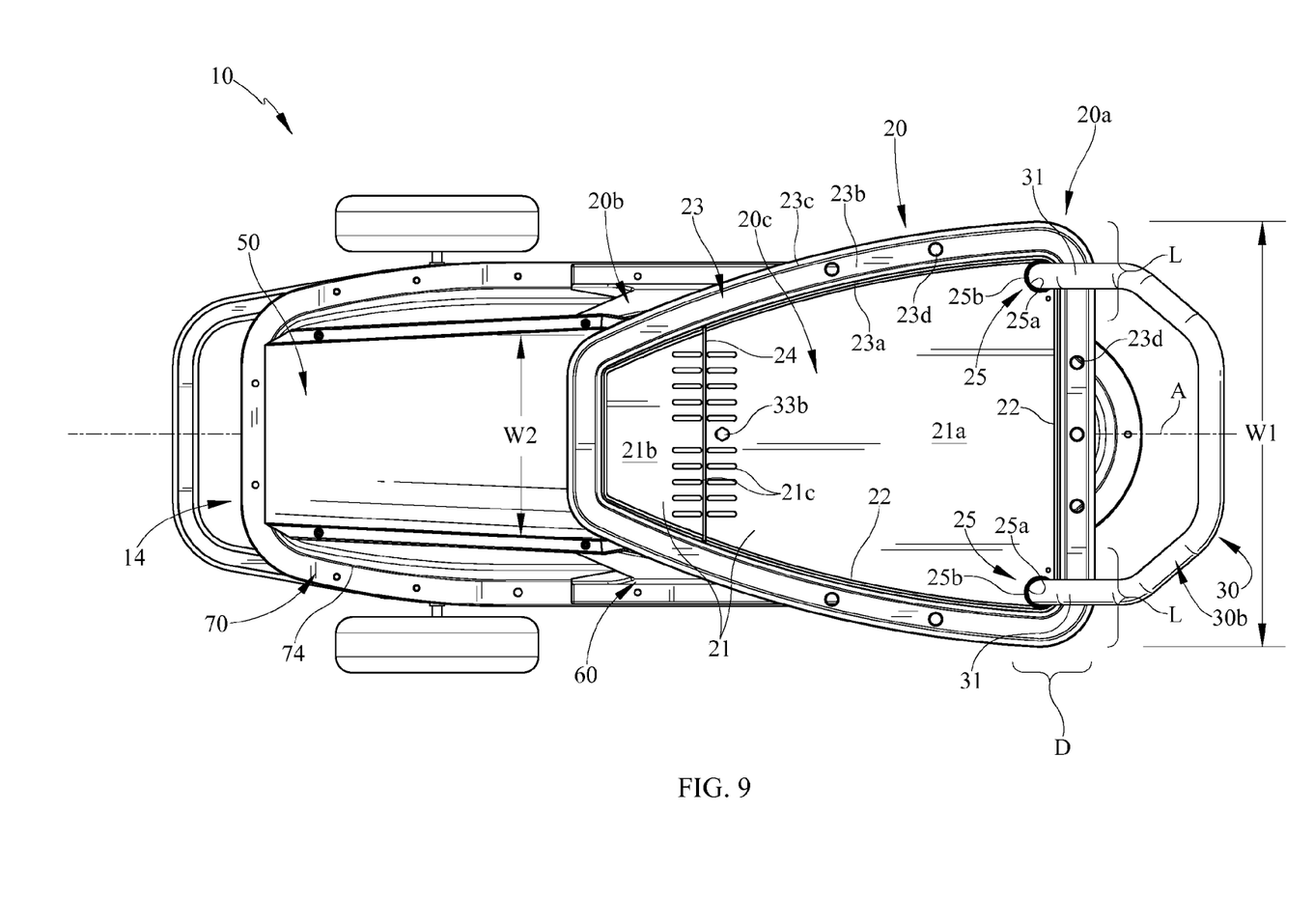
FIG. 9 is top view of the heating unit of FIG. 1.

The orientation, position, size and shape of the tray 20 relative to the heating unit 10 is but one embodiment shown in the Figures. The front portion 20b of the tray 20 is spaced from the housing outlet end 14, although may extend downstream of the inlet end 12 to a variety of distances. The front portion 20b being spaced from the outlet end 14 may subject the tray to less heat generated from within the housing 50 or combustion chamber 44. The rear portion 20a of the tray 20 is shown as extending rearwardly or outwardly beyond the longitudinal extent of the housing inlet end 12 creating a distal overhanging portion D, best shown in FIGS. 6 and 9. Further, the tray 20, tray opening 20c, and/or rim 23 as shown narrows or tapers, not limited to arcuate (shown) or straight, from its rear portion 20a to its front portion 20b towards the outlet end 14. As a result, the rear portion 20a has a first width W1 and the front portion 20b has a second width W2, with the second width W2 being smaller than the first width W1. The smaller second width W2 of the front portion 20b adjacent the combustion chamber assembly 40 may also reduce heat transfer to the tray 20 by reducing the amount of contact therebetween or tray surface area above the housing or chamber. The tray 20 may also be described as being in a tangential plane T relative to the curved outer surface of the cylindrical housing 50 or uppermost extent of the housing. As best shown in FIGS. 7-9, the tray 20 projects laterally relative to the elongated cylindrical housing 50, or substantially parallel or transverse to the longitudinal axis A, thereby creating lateral overhanging portions L. Thus the tray position and orientation reduces the contact of the tray to portions other than the overhanging portions D and L with the housing further reducing any heat transfer. Further, the overhanging portions D and L of the tray 20 extend beyond the peripheral extents of the housing 50 and may reduce undesirable weather or debris from contacting or entering the housing 50 or unit, such as but not limited to water. It should be understood that the tray 20 may be a variety of lengths, widths, shapes, sizes, constructions, orientations, and positions relative to the heating unit 10.

As shown in FIGS. 4 and 5-8, tray 20 may restrict lateral movement relative to the housing 50 by having a saddle member 27 connecting the tray bottom wall 21 to the housing 50. The saddle member 27 may include an arcuate or concave portion 27*a* opposite the bottom wall 21 receiving a portion of the circumference of cylindrical housing 50. The saddle member 27 may be described as straddling the cylindrical housing and provides opposing, lateral support ends 27*b* relative to the longitudinal axis A or length of the housing. Portions of the saddle member 27 may also include one or more ribs or plates 27*c* spaced along the longitudinal axis and/or perpendicular to the longitudinal axis minimizing the surface area contact with the housing 50. Stated alternatively, a honeycomb type pattern defining one or more apertures 27*d*, of one or more sizes, may result from the one or more ribs 27*c*. The one or more ribs 27*c*, with limited surface area contact with the housing wall, may minimize the transfer of heat from the housing 50 to the tray 20 and/or tray contents. Further, the saddle member 27 does not have to extend the entire longitudinal length of the tray as is shown and may be any number of quantities spaced along the tray length or longitudinal axis A. It should be understood that the saddle member 27 may be a variety of lengths, widths, shapes, sizes, constructions, orientations, and positions relative to the heating unit 10.

As shown in FIGS. 2 and 4-8, portions of the tray 20 or tray bottom wall surfaces may generally conform or contour to the housing or unit thereof. More specifically, the one or more exterior surfaces of the tray bottom wall 21 may be sloped similar to the interior of the tray. Although the housing 50 may be a variety of shapes, such as but not limited to cylindrical with a constant diameter, the housing includes an inlet section 51 of the cylindrical housing 50 at a constant first diameter at the inlet end 12 of the housing 50 and transitions to a diverging section 52. This diverging or expanding section 52 of the housing 50 increases in diameter in the direction of air flow from a first diameter at inlet end 52*a* to a larger second diameter at outlet end 52*b*. Although it is shown in detail as a straight taper, the diverging section 52 may be a variety of shapes or contours such as but not limited to arcuate and still diverge in the direction of the air flow through the unit. Diverging section 52 is shown as axially overlapping the combustion chamber assembly 40 or stated otherwise as longitudinally beginning after the combustion chamber assembly 40 begins in the direction of the air flow from the inlet end 12 to the outlet end 14. As such, the one embodiment shown illustrates that the diverging section inlet end 52*a* is positioned after heat shield 42 begins in the direction of air flow. A discharge end 54 of the housing 50 continues after the diverging section 52 towards the outlet end 14 of the housing 50. Thus, the contacting portion, between the overhanging portions D and L, of the tray bottom wall 21 may substantially contour to housing 50 at the inlet section 51 and the divergent section 52. More specifically, the slope of the front bottom wall surface 21*b* as described above coincides with the diverging section 52 of the housing 50.

Referring to FIGS. 2 and 7, as a result of the contact or close proximity between the housing 50 and the tray 20 additional cooling methods and structure in light of the description above may be used to reduce the transfer of heat generated from within the housing 50 to the tray 20. As described above, the combustion chamber assembly 40, combustion chamber 44, and/or heat shield 42 is radially spaced or spaced from the housing 50 creating the annular spacing therebetween, such as but not limited to 45*a* and 45*b*. Air circulated between the combustion chamber assembly 40 and housing 50 cools the burner head assembly 80, combustion chamber assembly 40, and housing 50. This spacing allows for pushed air to be circulated around the combustion chamber 44 thereby cooling the housing 50 and reducing the heat transfer to the tray 20 embodiments. In addition, the increased gap or annular spacing 45*b* at the housing divergent section 52 and the heat shield 42 may reduce the radiant heat absorbed by the housing 50 thereby cooling the front portion 20*b* of tray 20 overlying the combustion chamber 44, housing 50, and heat shield 42. Further, the transition to the divergent section 52 of the housing 50 may also provide increased strength as compared to housing of a constant diameter, since the housing metal is manufactured to a larger/different shape or size. Thereby the second attachment between the tray 20 and housing 50 adjacent the divergent section 52 may create a desired position for stability and support of the tray.

Although tray 20 is shown in detail in the drawings, it merely represents one embodiment, and it is to be understood that there are a variety of shapes, dimensions, quantities, positions relative to the housing or unit, compositions, and constructions which may be used and still be within the scope of these embodiments. For example, the tray 20 may be made from a variety of materials such as, but not limited to, plastics, metal, or combinations thereof.

It is understood that while certain embodiments of the invention have been illustrated and described, it is not limited thereto except insofar as such limitations are included in the following claims and allowable functional equivalents thereof.

We claim:

1. A portable heater comprising:
   an elongated heater housing having an inlet end and an outlet end;
   a combustion chamber positioned within said heater housing, wherein said combustion chamber and said heater housing define an airflow cooling channel therebetween;
   a tray disposed above said heater housing and adjacent said airflow cooling channel, said tray having a rear portion upstream from a front portion, wherein said tray includes a bottom wall and a projecting sidewall, wherein said sidewall defines a tray opening;
   wherein said front portion of said tray is spaced upstream from said outlet end of said housing; and
   wherein said tray narrows in a downstream direction from said rear portion to said front portion to reduce the exposure of heat from said combustion chamber to said tray.

2. The portable heater of claim 1 further comprising one or more handles connected to said portable heater, wherein said tray is secured at a first attachment to said one or more handles and is secured at a second attachment to said heater housing downstream of said inlet end towards said outlet end.

3. The portable heater of claim 2 wherein said tray further includes one or more collars receiving said one or more handles at said first attachment.

4. The portable heater of claim 3 wherein said one or more collars extend through said tray bottom wall rearwardly from said inlet end of said housing.

5. The portable heater of claim 1 wherein said rear portion of said tray projects rearwardly from said inlet end of said housing.

6. The portable heater of claim 1 wherein said tray bottom wall includes a saddle member engaging said heater housing.

7. A portable heater comprising:
an elongated cylindrical housing having an inlet end and an outlet end;
a combustion chamber positioned within said housing, wherein said combustion chamber and said housing define an airflow cooling channel therebetween;
a tray having a bottom wall and a sidewall, wherein said sidewall defines a tray opening;
said tray includes a rear portion upstream from a front portion, wherein said tray narrows from said rear portion towards said front portion to reduce the exposure of heat from said combustion chamber to said tray, thereby said rear portion of said tray includes a first width and said front portion of said tray includes a second width, wherein said first width is larger than said second width; and
wherein said tray includes a saddle member connecting said tray bottom wall to said cylindrical housing.

8. The portable heater of claim 7 wherein said saddle member includes one or more ribs.

9. The portable heater of claim 7 further comprising a handle carrier, said handle carrier extends through said bottom wall of said tray.

10. The portable heater of claim 7 wherein said tray further includes an outwardly projecting rim projecting from said sidewall and surrounding said tray opening.

11. The portable heater of claim 7 wherein said front portion of said tray is spaced upstream from said outlet end of said housing.

12. The portable heater of claim 7 wherein said tray is positioned above said housing and includes opposing overhanging portions laterally extending beyond the outermost lateral extent of said housing in a direction perpendicular to a longitudinal axis of said cylindrical housing.

13. A portable heater comprising:
an elongated housing extending along a longitudinal axis and having an inlet end and an outlet end;
a combustion chamber extending longitudinally through said housing;
a tray positioned above said housing and having an opening surrounded by a sidewall extending from a bottom wall;
a saddle member interconnecting said bottom wall of said tray to said housing, wherein said saddle member includes one or more ribs defining one or more apertures therein; and
wherein said saddle member includes an arcuate portion receiving said housing.

14. The portable heater of claim 13 wherein said bottom wall of said tray includes one or more collars, wherein said one or more collars receives a handle carrier.

15. The portable heater of claim 13 wherein said tray includes a rim surrounding an outer periphery of said sidewall.

16. The portable heater of claim 13 wherein said tray opening narrows in a direction from said inlet end to said outlet end.

17. The portable heater of claim 13 wherein said saddle member includes support ends position on laterally opposing sides of said housing relative to said longitudinal axis.

18. A portable heater comprising:
an elongated heater housing having an inlet end and an outlet end;
a combustion chamber positioned within said heater housing, wherein said combustion chamber and said heater housing define an airflow cooling channel therebetween;
a tray disposed above said heater housing and adjacent said airflow cooling channel, said tray having a rear portion upstream from a front portion, wherein said tray includes a bottom wall and a projecting sidewall, wherein said sidewall defines a tray opening;
wherein said front portion of said tray is spaced upstream from said outlet end of said housing; and
one or more handles connected to said portable heater, wherein said tray is secured at a first attachment to said one or more handles and is secured at a second attachment to said heater housing downstream of said inlet end towards said outlet end.

19. A portable heater comprising:
an elongated cylindrical housing having an inlet end and an outlet end;
a combustion chamber positioned within said housing, wherein said combustion chamber and said housing define an airflow cooling channel therebetween;
a tray having a bottom wall and a sidewall, wherein said sidewall defines a tray opening;
said tray includes a rear portion upstream from a front portion, wherein said tray narrows from said rear portion towards said front portion to reduce the exposure of heat from said combustion chamber to said tray, thereby said rear portion of said tray includes a first width and said front portion of said tray includes a second width, wherein said first width is larger than said second width; and
wherein said tray is positioned above said housing and includes opposing overhanging portions laterally extending beyond the outermost lateral extent of said housing in a direction perpendicular to a longitudinal axis of said cylindrical housing.

\* \* \* \* \*